(12) United States Patent
Simms et al.

(10) Patent No.: US 6,933,832 B1
(45) Date of Patent: Aug. 23, 2005

(54) AUTOMATED RECEIVING AND DELIVERY SYSTEM AND METHOD

(76) Inventors: Noel Simms, 4711 N. 36th St., Arlington, VA (US) 22207; John Simms, 6037 Crimson Ct., McLean, VA (US) 22101

( * ) Notice: Subject to any disclaimer, the term of this patent is extended or adjusted under 35 U.S.C. 154(b) by 583 days.

(21) Appl. No.: 09/708,571

(22) Filed: Nov. 9, 2000

Related U.S. Application Data

(60) Provisional application No. 60/164,267, filed on Nov. 9, 1999.

(51) Int. Cl.[7] .................................................. H04Q 9/00
(52) U.S. Cl. ........................ 340/5.73; 232/24; 235/385; 705/26
(58) Field of Search .............................. 340/568.1, 569, 340/5.73; 232/24, 27; 235/385; 705/26

(56) References Cited

U.S. PATENT DOCUMENTS

| | | | |
|---|---|---|---|
| 5,245,329 A | * | 9/1993 | Gokcebay .............. 340/825.31 |
| 5,397,884 A | * | 3/1995 | Saliga ..................... 235/382.5 |
| 5,687,322 A | | 11/1997 | Deaton et al. |
| 6,014,651 A | | 1/2000 | Crawford |
| 6,323,782 B1 | * | 11/2001 | Stephens et al. ....... 340/825.31 |

* cited by examiner

Primary Examiner—Michael Horabik
Assistant Examiner—M Shimizu
(74) Attorney, Agent, or Firm—Miles & Stockbridge P.C.; Dennis P. Clarke

(57) ABSTRACT

A system and method uses an appliance for delivery at a home or business when no one is home or without the need to disturb persons at the delivery site. The appliance is a locked storage container connected to remote computers such that access for particular delivery persons or companies is authorized when the owner of the appliance has placed an order. The appliance communicates, such as via the internet, with a remote delivery system computer having a scheduler that schedules deliveries during particular time intervals. Prior to scheduling the delivery, the delivery system computer compares the dimensions of the order with the available space within the appliance of the customer. After a delivery is made, the appliance communicates via the internet that the delivery has been made and the delivery system computer then charges or debits the customer's account for the cost associated with the delivery.

21 Claims, 7 Drawing Sheets

AUTOMATED RECEIVING AND DELIVERY SYSTEM AND METHOD

This application claims benefit of 60/164,267 filed Nov. 9, 1999.

BACKGROUND OF THE INVENTION

1. Field of the Invention

The invention relates to a system, device and method for receiving goods or other items, purchasing goods, scheduling and tracking deliveries, receiving deliveries or ordered items utilizing a specialized device, making and processing payment, inventorying items scheduled for delivery and items delivered and making information about deliveries available through a variety of means.

2. Discussion of the Prior Art

The recent upsurge in e-commerce whereby a consumer accesses a website over the Internet to purchase goods for delivery to the home, office or other site has created an increased need for scheduling and tracking the deliveries, as well as for providing a safe and secure site for receipt of the goods when they are delivered to an unoccupied site. The convenience of being able to avoid making a trip to a retail store or outlet to purchase goods, and being able to order such goods for deliveries to home, office or other site "on-line" is off-set by the problems surrounding the delivery of the goods to the purchaser. If the purchaser is not available on-site to receive the goods, he must either re-schedule for another delivery or the goods must be left unsecured at the site, thereby being subject to theft or damage.

It is an object of the invention to provide a device which enables the safe and secure receipt of purchased or other goods, delivered to a site without a person in attendance.

It is a further object of the invention to provide a system for the remote purchasing of goods, making and processing payment therefor, inventorying the purchased goods, scheduling and tracking the delivery of the goods, as well as making information available about the delivery through a variety of means.

It is still a further object of the invention to provide a method for the remote purchasing of goods and for providing the safe and secure delivery of the purchased goods to a desired site.

Yet another object of the invention is to provide a delivery technique where the size (overall volume and length, height, and width) of an order is compared to available space (volume and length, height, and width) within a locked storage container or appliance in which the delivery is to be made, delivery is scheduled for a time when sufficient space is available, and access to the locked storage container is granted to a delivery person only during a scheduled time interval.

A still further object of the invention to provide delivery to a locked storage container corresponding to a customer and where an account of the customer is charged for the delivery (i.e., the costs of the goods and/or the delivery service) upon insertion of the order with the container.

SUMMARY OF THE INVENTION

The above and other objects are realized by the present invention, one embodiment of which comprises a storage appliance or device at a fixed site/location/address which is accessible by means of an identifier unlocking a locked entry door. (As used herein, an "identifier" includes a physical device, such as a key, electronic key, smart card, magnetic card, or similar device carried or transported by an individual to give access or a biometric property such as fingerprint, voice pattern as recognized by a machine, or retinal scan of a delivery person. The identifier is associated with a particular person, such as a delivery person, or a particular company.) The typical location is near or affixed to the exterior of a home or office. The appliance is capable of receiving and storing goods for delivery or pickup with a level of security preventing unauthorized entry or theft and with protection against pests and unfavorable weather conditions. The appliance may be equipped with multiple storage areas, some of which may be cooled or heated. The appliance may be free-standing, secured to a fixed location or affixed to a structure.

A further embodiment of the invention relates to a system comprising the appliance in electronic communication with a computer or computer network. This communication may be affected by a variety of means, including any form of telephonic signal, television cable, computer network cable, radio signal or the like.

The appliance receives and transmits data to the computer or computer network (hereinafter referred to as the "scheduler") which is capable of organizing and recording a schedule of deliveries and pickups utilizing the appliance and transmitting instructions to the appliance allowing it to identify an identifier authorized to access the appliance in accordance with a schedule. As mentioned previously, the identifier may be a physical access device such as key, an electronic key, smart card, magnetic card, or a biometric property of a delivery person as sensed by sensors. However, and for ease of discussion below, reference below will often be to a key and it will be understood that other devices or biometric properties could be used in lieu thereof. The appliance may be identified by the computer or computer network with which it is communicating by identification number, name or location. Each appliance may be associated with a user account record or records.

Still another embodiment of the invention comprises a method of scheduling and tracking deliveries, of receiving deliveries utilizing a specialized device, of making and processing payment, of inventorying items scheduled for delivery and items delivered and of making information about deliveries available through a variety of means. Users of the method may be entities desiring to make deliveries and/or to receive deliveries. Users of the method may schedule delivery, track shipment and delivery, make secure delivery by means of a specialized appliance, make and confirm payment, inventory items scheduled for delivery and delivered. Users of the method may access data regarding the appliance and/or delivery location stored on computer or computer network and accessed by a variety of means including telephone, radio, computer network or the Internet. The type of data which may be accessed includes data concerning the location of the appliance and alternative delivery locations, the capacity and type of storage of the appliance, the type and availability of storage capacity at the time and date of intended delivery and special instructions or other information pertaining to the delivery appliance and location and method of payment.

The method of the present invention may alternately be described as a method of: delivery of ordered items to a plurality of locked storage containers, each associated with a corresponding customer, using a delivery system including a scheduler, the steps including: ordering a first delivery of one or more goods for a first customer associated with a first locked storage container of the plurality of locked storage containers; following the ordering of the first delivery, determining the availability of the first locked storage container to receive the first delivery at one or more times by use of the scheduler; identifying, using the scheduler, a first time interval during which the first delivery can be made; and the delivery system sending to the first locked storage container an access signal allowing a first delivery person who is delivering the delivery to access the first locked storage container only during the first time interval. The steps include: ordering a second delivery of one or more goods for the first customer; following the ordering of the second delivery, determining the availability of the first locked storage container to receive the second delivery at one or more times by use of the scheduler; identifying, using the scheduler, a second time interval during which the second delivery can be made; and the delivery system sending to the first locked storage container an access signal allowing a second delivery person who is delivering the second delivery to access the first locked storage container only during the second time interval.

A delivery is ordered for one or more goods for a second customer associated with a second locked storage container of the plurality of locked storage containers. Following the ordering of the last-mentioned delivery, the availability of the second locked storage container to receive the last-mentioned delivery at one or more times by use of the schedule is determined. The method identifies, using the scheduler, a second customer time interval during which the last-mentioned delivery can be made; and the delivery system sends to the second locked storage container an access signal allowing a delivery person who is delivering the last-mentioned delivery to access the second locked storage container only during the second customer time interval. The first delivery person opens the first locked storage container using an identifier corresponding to the first delivery person and the second delivery person opens the first locked storage container using an identifier corresponding to the second delivery person.

Following the ordering, the size of the delivery is determined using the delivery system. Available room with the first locked storage container is checked by use of the delivery system. Upon availability as indicated by the checking step, the delivery system reserves sufficient room within the first locked storage container to receive the delivery.

Following the first delivery, an account of the first customer is charged for the first delivery upon the first locked storage container signaling the delivery system of the insertion of the first delivery into the first locked storage container. The first locked storage container signals the delivery system of the insertion of the first delivery into the first locked storage container based on access by the first delivery person.

The invention may alternately be described as a method of delivery of ordered items to a plurality of locked storage containers using a delivery system, the steps including: ordering a delivery of one or more goods to a first customer; following the ordering, determining the size of the delivery using the delivery system; checking available room within a first locked storage container of the plurality of locked storage containers, the first locked storage container corresponding to the first customer, by use of the delivery system; upon availability, reserving, by operation of the delivery system, sufficient room within the first locked storage container to receive the delivery; and delivering the delivery to within the first locked storage container. Upon finding that the available room within the first locked storage container is insufficient for the size of the delivery, the ordered delivery is divided into at least first and second partial deliveries for separate delivery upon there being available room. The delivery system includes a scheduler and the method further includes the steps of: following the ordering of the delivery, determining the availability of the first locked storage container to receive the first and parts at one or more times by use of the scheduler; identifying, using the scheduler, a first time interval during which the first partial delivery can be made and a second time interval during which the second partial delivery can be made; and the delivery system sending to the first locked storage container an access signal allowing access to the first locked storage container only during the first time interval for delivery of the first partial delivery and during the second time interval for delivery of the second partial delivery. Prior to dividing the ordered delivery, input is received from the customer indicating the customer's preference for a complete delivery or delivery in multiple portions; and the scheduler schedules delivery according to the customer's preference. The method of further includes the step of: charging an account of the first customer for a delivery upon the locked storage container signaling the delivery system of the insertion of a delivery into the locked storage container.

The invention may alternately be described as a method for delivery of ordered items to a plurality of locked storage containers using a delivery system, the steps including: ordering a delivery of one or more goods to a customer; delivering the delivery to within one of the locked storage containers corresponding to the customer; and automatically sending a DELIVERY MADE signal from the one of the locked storage containers signaling the delivery system of the insertion of the delivery into the one of the locked storage containers. Upon the delivery system receiving the DELIVERY MADE signal, the delivery system performs one or more steps selected from the group consisting of: charging an account of the customer for the delivery; and automatically initiating a communication to the customer. The delivery system includes a scheduler and further includes the steps of: following the ordering, determining the availability of the one of the locked storage containers to receive the delivery at one or more times by use of the scheduler; identifying, using the scheduler, a first time interval during which the delivery can be made; and the delivery system sending to the one of the locked storage containers an access signal allowing a first delivery person who is delivering the delivery to access the one of the locked storage containers only during the first time interval. The method further includes the steps of: following the ordering, determining the size of the delivery using the delivery system; and checking available room with the one of the locked storage containers by use of the delivery system.

The delivery system of the present invention may be described as for delivery of items includes: a plurality of locked storage containers at different locations, each locked storage container corresponding to a customer: order receiver within the delivery system for receiving orders for delivery of one or more goods for customer; availability determiner for determining the availability of the locked storage containers to receive deliveries at one or more times; a scheduler receiving availability information from the availability determiner and operable to identify a time interval during which the delivery can be made and operable to send to a locked storage container an access signal allowing a delivery person who is delivering a delivery to access the locked storage container only during the time interval identified by the scheduler.

The appliance of the present invention is an appliance for securely receiving deliveries without requiring a person in attendance to accept delivery includes: a storage container; a lock controlling access to the storage container; and a communication link connected to the lock and operable to receive an access signal from a remote location to allow access to the storage container; and wherein the lock is responsive to the communication link receiving the access signal by unlocking upon presentation of an identifier selected from the group consisting of: a physical device granting access, and one or more biometric properties.

DETAILED DESCRIPTION OF THE INVENTION

Figure 1:
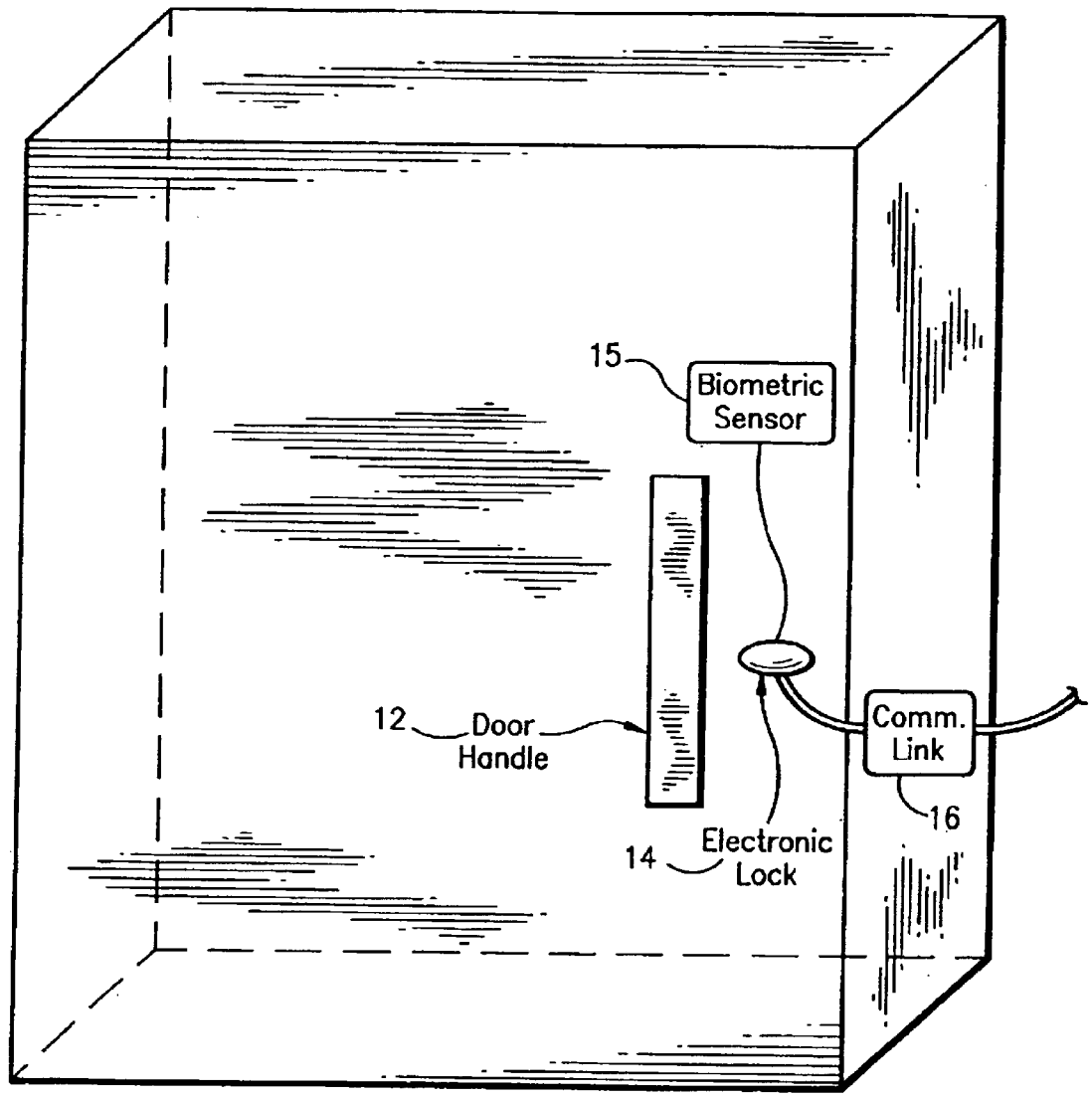
FIG. 1 is an elevational view of a storage appliance embodiment of the invention.

FIG. 1 shows an appliance 10 according to the present invention. The appliance 10 is a locked storage container with a door handle 12 and an electronic lock 14. The lock 14 may be accessed by a universal key, other physical device or other identifier (including biometric properties as discussed above). The lock 14 is capable of identifying electronically or by other means the key (more generally the identifier) being used for unlocking or opening the appliance. However, in the preferred design the appliance 10 is capable of identifying specific keys authorized for entry and/or permitting access by unlocking the door based on instructions communicated to it by a scheduler, remotely located. The scheduler is connected to lock 14 via communications link 16 such as a modem or other interface to the telephone system, the internet or other communications, and discussed in more detail below. The appliance is also capable of denying entry to keys not authorized for delivery or not authorized for delivery at that time. The appliance is preferably capable of recording and/or transmitting a log or other itemized listing of authorized and unauthorized attempt(s) at opening the appliance and may include among other information the electronic identity of each key, the date and time of the attempt.

The access to appliance 10 may be explained by an example. A first delivery person working for a first company may have an electronic key, such as a smart card or magnetic card, unique to that individual or the first company. Alternately, and in lieu of the key or other physical access device, a biometric property (such as fingerprint, voice pattern, retinal pattern) of the delivery person may be read by an optional biometric sensor 15. A second delivery person working for a second company may have an electronic key, such as a smart card or magnetic card, unique to that individual or the second company. The first delivery person may be scheduled for accessing the appliance 10 during a first time interval such as between 9 AM and 12 noon on a given day, whereas the second delivery person may be scheduled for accessing the appliance 10 during a second time interval such as between 1 PM and 4 PM on the same day. Under such circumstances, the lock 14 could only be opened by the first delivery person's electronic key (not shown) during the first time interval, whereas the lock 14 could only be opened by the second delivery person's electronic key (not shown) during the second time interval. This assumes that the scheduler switches the lock 14 into an access state in which it is unlockable by an electronic ey. Alternately, the scheduler could simply unlock the lock 14 so that a person could insert items in the appliance without needing a lock.

The time intervals might be much longer then the several hour time intervals above. For example, a time interval of 24 or more hours for a delivery might be used. Further, the first and second time intervals might overlap or even be identical (i.e., two deliveries scheduled for the same time interval).

Figure 2:
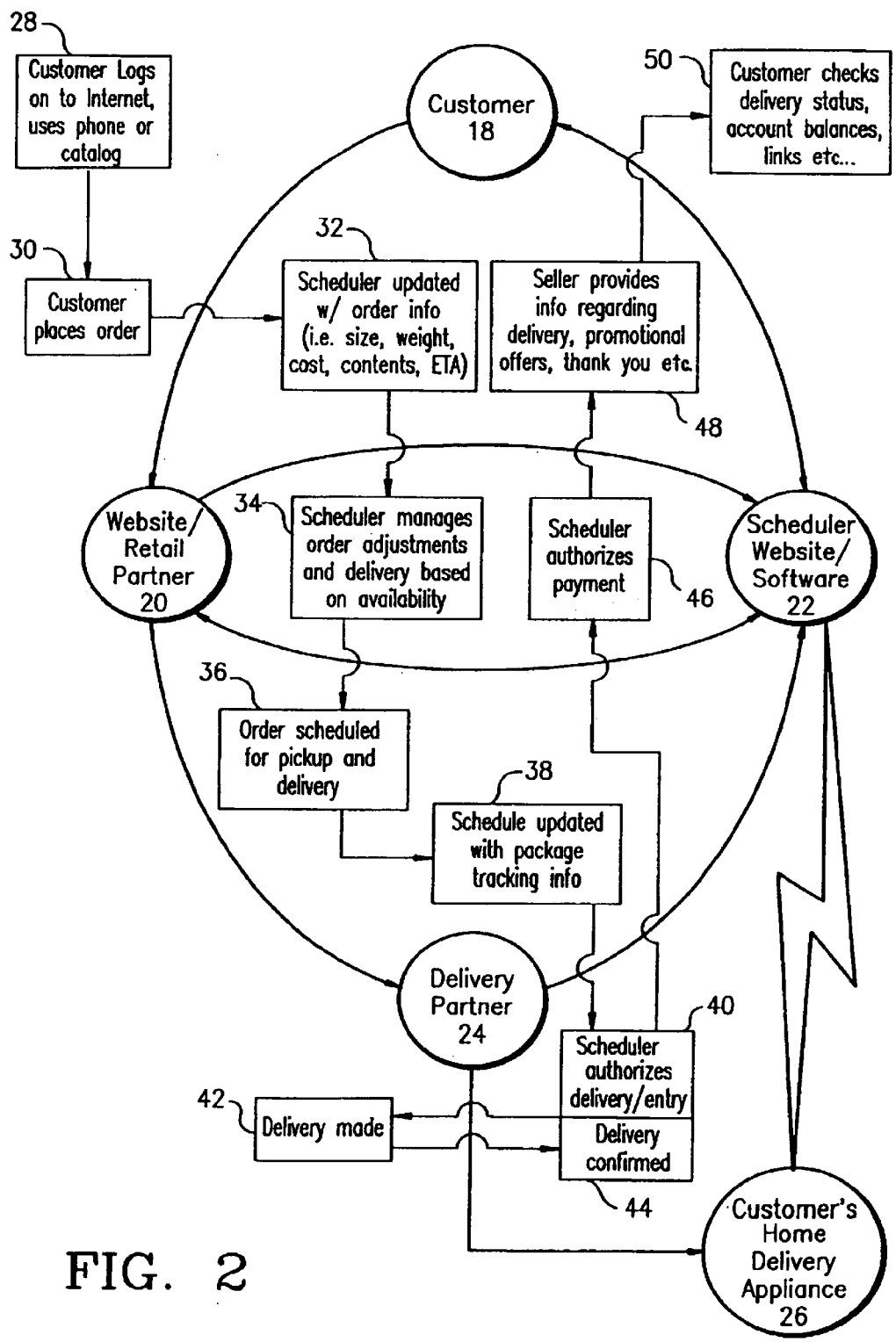
FIG. 2 is a flow sheet depicting the steps of the method of the invention overlaid on the main components or participants in the method.
Figure 3:
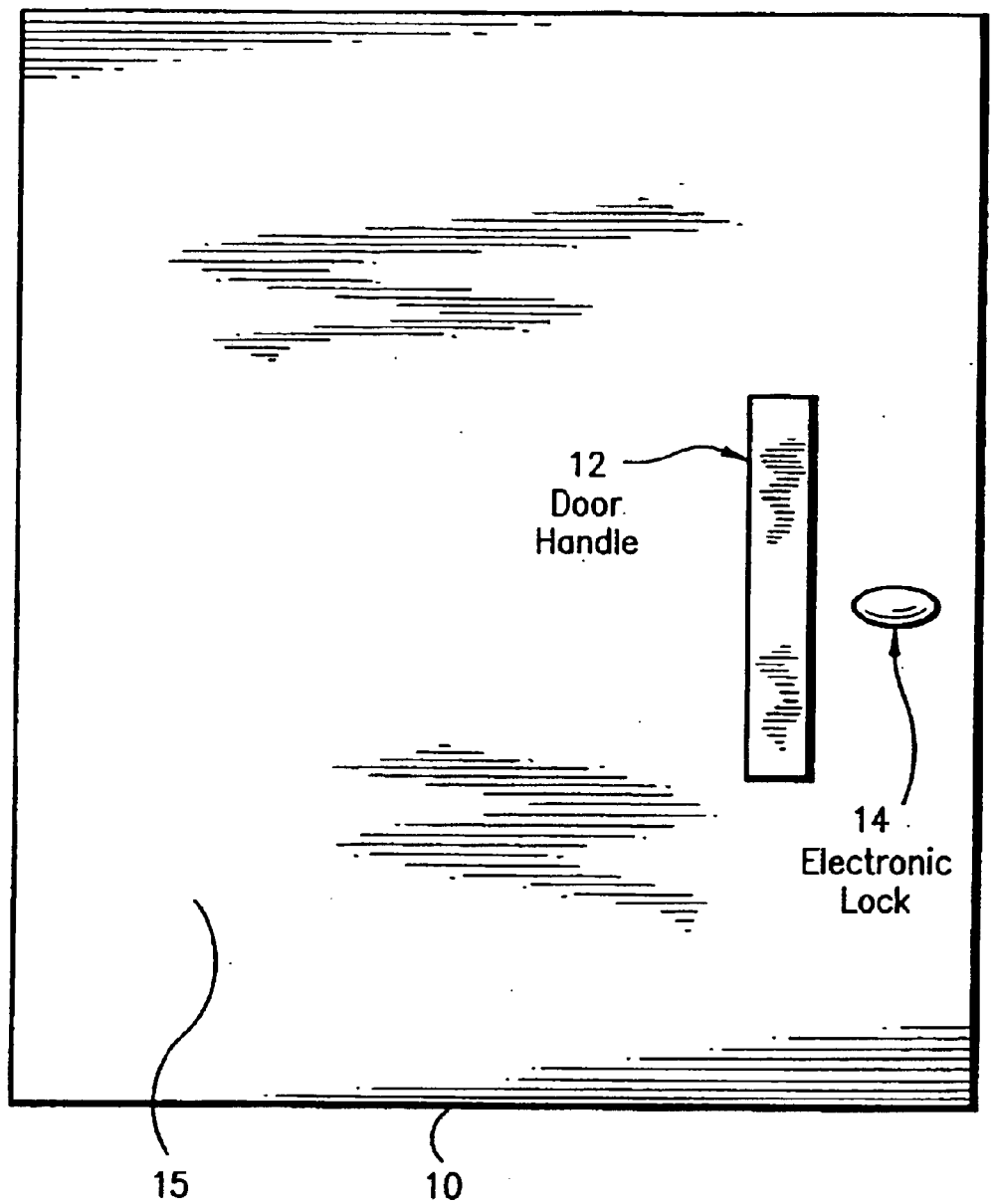
FIG. 3 is an elevational view of the front of the storage appliance embodiment of the invention.
Figure 4:
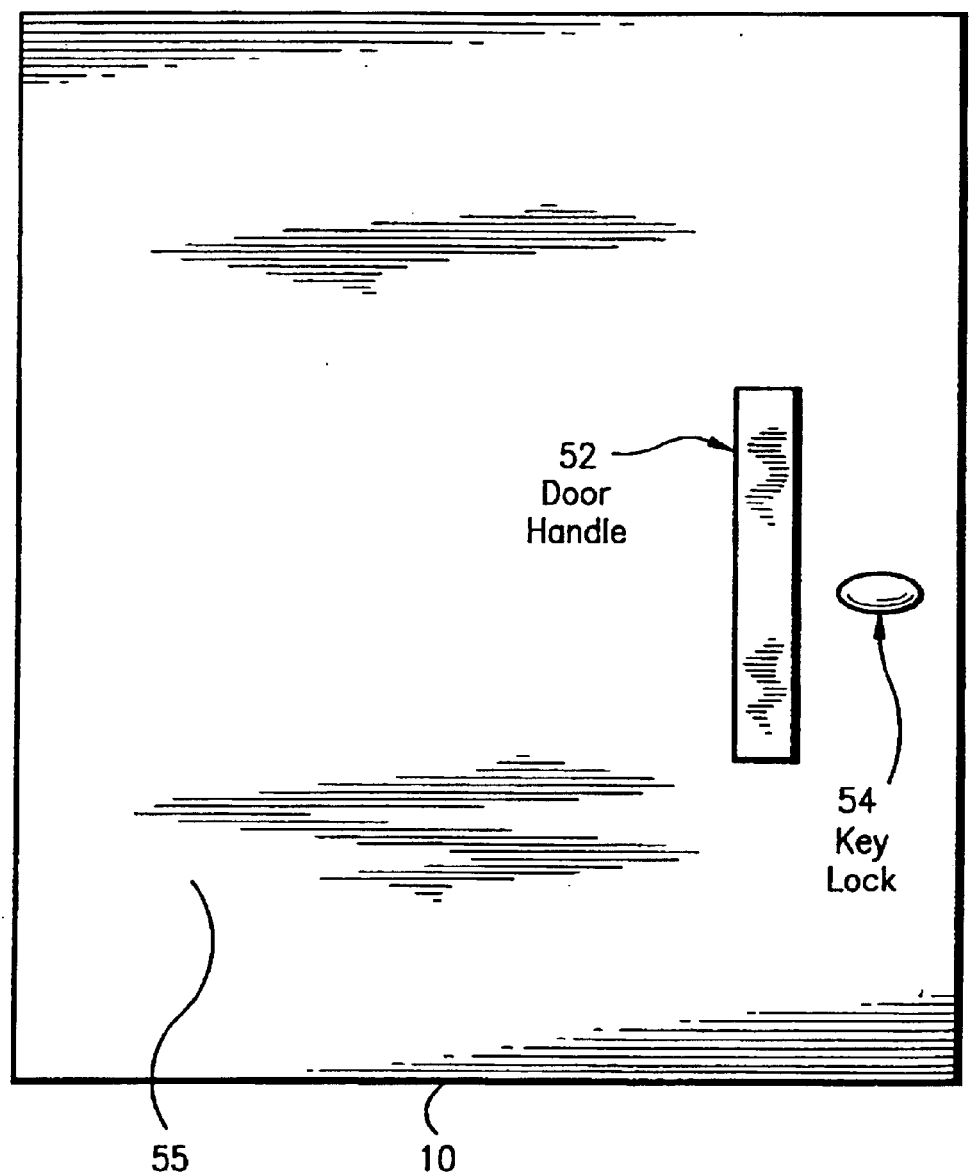
FIG. 4 is an elevational view of the rear of the storage appliance embodiment of the invention.
Figure 5:
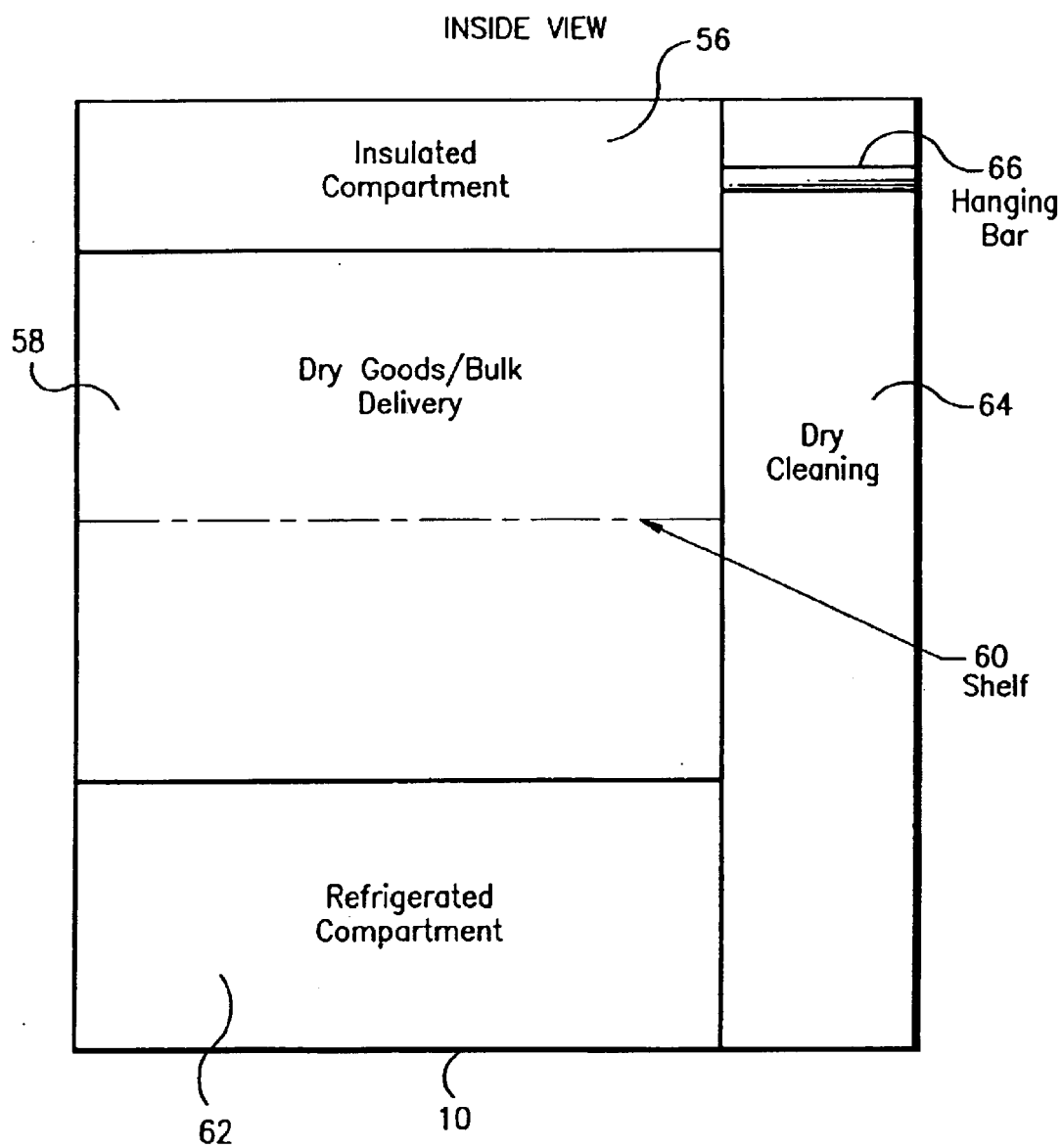
FIG. 5 is a cut-away view of the interior of the storage appliance embodiment of the invention.

In a typical use of the device, system and method of the invention, and with particular reference to FIG. 2, a flow chart is shown overlaid on the main components or participants linked as shown. Discussing first, the main components or participants, the customer 18 is linked to website/retail partner 20 which in turn is linked to a scheduler website software 22 and delivery partner 24. The delivery partner 24 in turn is linked to website/retail partner 20 and also to the customer's home delivery attendant 26. The various illustrated links between 18, 20, 22, 24, and 26 would preferably be internet links, but telephone or other links could also be used for some or all of the links. It should be understood that the components 18 through 26 are shown for a particular customer, but in practice there would be a plurality of customers 18 each having an associated home delivery attendant 26. Additionally, the scheduler website/software may interact with a plurality of retail outlets 20 and a plurality of delivery partners 24. For example, there may be a retailer 20 for books, a different retailer 20 for clothing, and numerous other retailers, some competitive with others, all linked to the scheduler 22. The various delivery partners may be specialized on a geographic basis, a delivery basis (i.e., one delivers within one day, another delivers within three days, etc.), and possibly by the type of delivery being made. As will be discussed below, some orders may involve products requiring special handling such as refrigeration in transit and the delivery partner delivering such products may need a refrigerator section in a delivery truck.

Turning now to the flow chart part of FIG. 2, the steps are numbered 28 to 50, steps 40 and 44 being within a common box. At box 28, a consumer accesses an e-commerce website over the Internet to purchase goods for home delivery. The consumer identifies himself/herself as an account holder. The retailer/vendor 20 electronically looks up and verifies the account of the consumer against a register or database of accounts made available on-line by the scheduler 22. An account holder is an authorized user of an appliance(s) 10 (FIG. 1 only) capable of unattended receipt/delivery and of electronically communicating with a specialized computer program (scheduler) which schedules deliveries to the appliance and reports deliveries to the account holder. The consumer selects items for purchase and delivery and fills an electronic shopping cart.

It will be understood that the invention also contemplates delivery of items ordered by telephone, mail, or in person at a retail store. The invention also may be used for receiving items that do not involve a commercial transaction. For example, a neighbor could return a borrowed item to the person owning the storage container.

As the shopping cart is loaded with goods selected, the estimated total size of the bundle of items as measured by the dimensions of height, width and depth is calculated (with software provided by the scheduler) based on information provided by the seller. Accessing information (provided by the scheduler over a computer network of the Internet) regarding the type and capacity of the appliance and the estimated remaining capacity of the appliance at the projected time/date of delivery, the estimated size of the bundle of items is compared against the total volume (including the various dimensions) of space remaining available in the consumer's designated appliance(s) on the time/date of the proposed date of delivery. Thus, an order that has a length of 5 feet will require 5 feet available within the appliance 10. If the volume or any dimension of the order exceeds available capacity, the consumer is given the option of splitting the delivery into two or more deliveries, of rescheduling the delivery for another time when capacity is available, or of removing items from the shopping cart.

The retailer or seller notifies the consumer of the final purchase price including shipping and handling. At step 30, the consumer authorizes the purchase and indicates method of payment. The consumer may arrange for payment to seller directly or by debit or credit accounts linked to the consumer's account. The seller finalizes the sale. At block 32, the seller notifies the scheduler 22 (a specialized computer program running on a delivery system computer) of the time/date of the intended delivery and the estimated size of the bundle of items. The scheduler reserves the capacity in the designated appliance for the scheduled time/date of the delivery. The seller also electronically provides to the scheduler (in format specified by the scheduler) an inventory of items purchased, itemized prices of each item purchased, itemized shipping and handling costs, and any other information permitted by the scheduler including coupon or "cents off" offers and other advertising and promotional information. This information provided by the seller may be made accessible by the scheduler to the consumer by a variety of means and formats, including computer networks, the Internet, electronic mail, telephone or printed matter.

The seller prepares the order for shipment. If any of the items are unavailable at the time that the order is being filled or if other items are added to the shipment for any reason, the estimated size of the bundle of items is adjusted. At step 34, the seller accesses information provided by the scheduler regarding the then available capacity at the time/date of delivery. If space is available, the shipment is scheduled at step 36. If space is unavailable, the shipment is adjusted interactively until available space capacity can be confirmed and reserved. At step 38, the seller electronically provides to the scheduler information to update the order, including any shipping information, routing or tracking numbers, etc., and any additional advertising or promotional information.

Preceding the time/date of each scheduled delivery, the scheduler communicates at step 40 electronic instructions to the appliance to permit entry to delivery personnel using a key which is identified by the appliance and matches a key authorized for entry for the scheduled delivery at that date/time (a time interval within an assigned date, or optionally, more than one date). If a key does not match a key authorized for entry at that time/date, entry will be denied. Once entry is gained for an authorized key, that key will be locked out until re-authorized.

When a delivery is made to the appliance 10 at step 42, the appliance communicates to the scheduler (by sending a "delivery made" signal) that the delivery was completed at step 44. Debit or credit sales at the point of delivery are processed for payment (costs of the goods and/or delivery applied to an account of the customer) at step 46. The scheduler updates the consumer's account with the time/date of receipt. The vendor selling the goods or service making the delivery may also provide information to the customer's account regarding the time/date of delivery, promotional material and other information specified above, including a "thank you" for the purchase at step 48.

The scheduler updates the consumer's account with various information regarding each purchase and scheduled delivery at step 50. The consumer may access this information through a variety of means including a computer network, an email, the Internet (i.e., checking a web page), a text message to the consumer's pager, or telephone. The consumer may review his/her account through a variety of views including available capacity by time period, committed capacity by time period, chronological list of scheduled deliveries, chronological list of scheduled deliveries by vendor, chronological list of scheduled deliveries by vendor classification (i.e., groceries, dry cleaning, etc.), deliveries made, deliveries missed, inventory of items ordered or delivered (by vendor, vendor classification, time period, etc.), inventory of items ordered but not shipped, calculation of costs (by vendor, vendor type, time period, method of payment, shipping and handling, etc.).

The consumer account holder may request to be notified at various stages of the shipping and delivery process. In addition to information, which is updated to the consumer's account and available by means previously specified, the notification may be made via electronic mail, voice or text pager, or telephone.

Although the discussion refers to consumers placing the orders, it will be understood that the person ordering may also be a business customer ordering supplies for a business.

Turning now to FIGS. 2–5, the appliance 10 details will be discussed. Door handle 12 and electronic lock 14 are on the front of the appliance 10 and would be used by delivery persons to access the appliance via a front door 15. Door handle 52 and key lock 54 would be used by the customer (i.e., appliance owner) to access the rear door 55 of the appliance 10. In practice, the appliance 10 may have its front door 15 on the outside of a house (not shown) with the rear door 55 on the inside of the house. In that case, the appliance would fit in an opening in the wall of the house in similar fashion to some room air conditioners. The inside of the appliance 10 includes an insulated compartment 56 where items such as hot food (pizza, etc.) may maintain their heat. Dry goods or bulk items may be placed within compartment 58 which is subdivided by a shelf 60. A refrigerated compartment 62 and dry cleaning section 64 with a bar 66 for hanging clothes are also included. Although not separately shown, a heated compartment and a freezer compartment may also be included.

Figure 6:
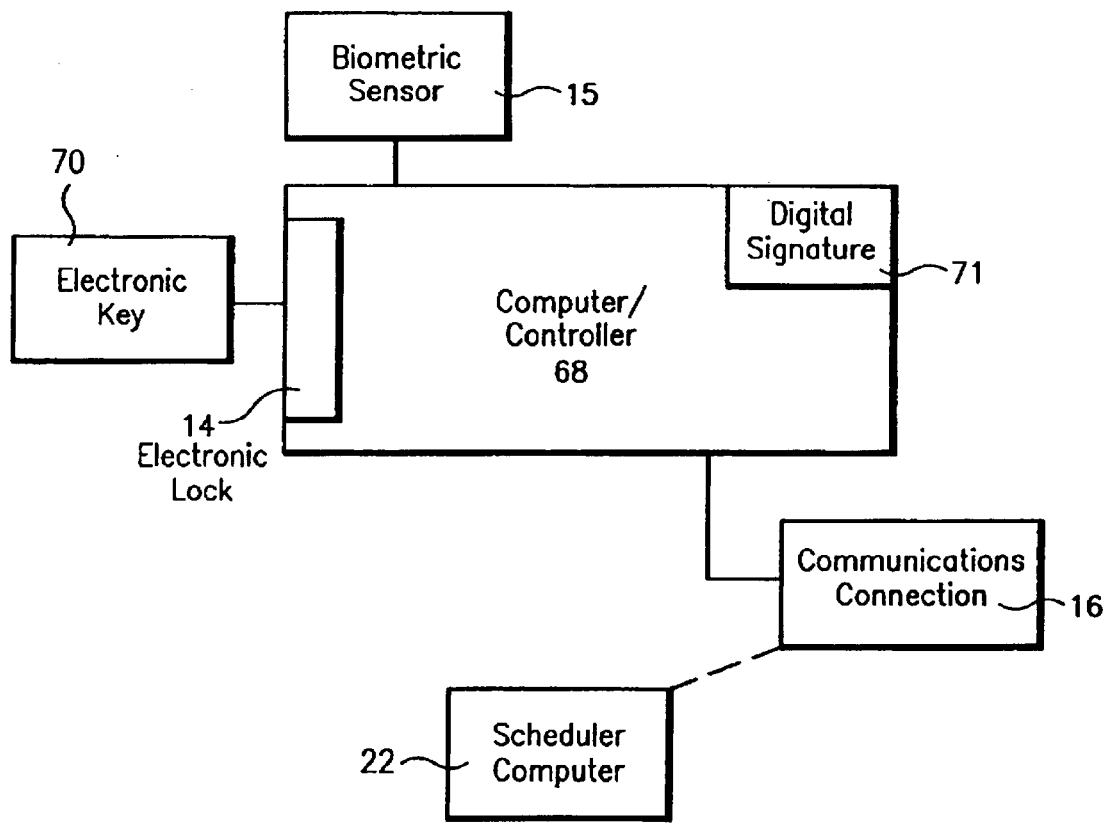
FIG. 6 is a block diagram of the part of the system embodiment of the invention utilizing a computer as the controller between the electronic key to the storage appliance and the communications network.

Turning now to FIG. 6, the electronic lock 14 is connected to a computer/controller 68 that is in the appliance 10. The computer/controller 68, which may operate solenoids or other actuators (not shown) in order to unlock lock 14 or render it accessible (i.e., ready to be unlocked) via electronic key 70, communicates via communication link 16 with the scheduler 22. The link 16 may connect to scheduler 22 via the internet, telephone system, cable, wireless or other technique.

A digital signature 71 may be stored within computer 68 and may be used for acknowledging special deliveries. For example, the delivery of certain pharmaceutical products may require a signature to acknowledge receipt. Upon the insertion of a pharmaceutical delivery (or any other delivery where signature is desired or required), the computer 68 may send, as part of a DELIVERY MADE signal, an appended digital signature to authenticate the delivery. Alternately, the electronic key 70 may be part of or connected to a small computer carried by the delivery person and operable to receive the digital signature acknowledging receipt of the delivery. Recent changes in the law in the United States, among other countries, may allow such digital signatures to be used in situations where written signatures were previously used.

Figure 7:
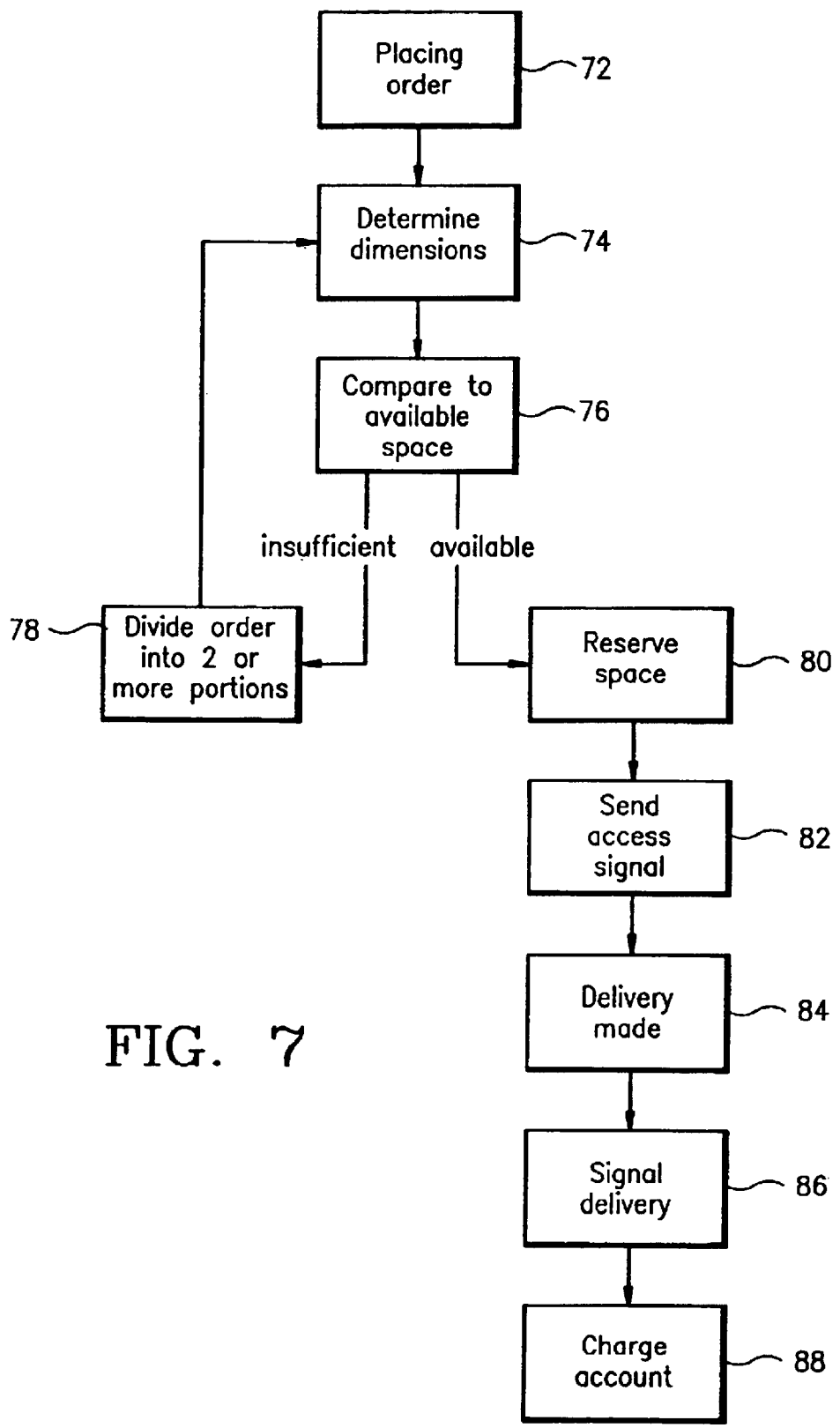
FIG. 7 is a simplified flow chart of a process of the present invention.

Turning now to FIG. 7, but also considering FIG. 2, a flow chart of some key aspects of the method of the present invention will be discussed. Except as otherwise noted the steps in FIG. 7 are performed by scheduler 22. The order is placed at step 72 by a customer on his/her computer which communicates it to the scheduler 22. At block 74, the scheduler 22 determines the dimensions of the order. These dimensions may have been supplied to scheduler 22 by the retailer 20. At block 76, the scheduler 22 compares the dimensions of the order with the available space within the appliance 10 for a given time period. The scheduler may keep a running total of space available within the appliance. Alternately, the computer 68 of FIG. 6 may keep a running total of space available that is supplied, upon automated request, to the scheduler.

If block 76 determines that not enough space is available, control goes to block 78 where the order is divided into two or more portions for separate delivery before returning to block 74.

Once block 76 determines that sufficient space is available, control goes to block 80 where space for the delivery is reserved. Next, block 82 sends an access signal from the scheduler 22 to the appliance 10 such that a delivery person may unlock it during a prescribed time interval. Block 84 indicates that the delivery is made, after which block 86 corresponds to the computer 68 of the appliance 10 sending a delivery made signal to the scheduler. Upon receipt of the signal indicating delivery, the scheduler 22 or another part of the delivery system computer on which the scheduling software runs, sends a charge account signal. The charge account signal debits or charges the customer's account for the delivery which had just been made.

Although various specific constructions and steps have been shown and discussed, these are for illustrative purposes only. Various modifications will be apparent to those of skill in the art. Therefore, the scope of the present invention should be determined with reference to the claims appended hereto.

What is claimed is:

1. A method of delivery of ordered items to a plurality of locked storage containers, each associated with a corresponding customer, using a delivery system including a scheduler, the steps including:

ordering a first delivery of one or more goods for a first customer associated with a first locked storage container of the plurality of locked storage containers;

following the ordering of the first delivery, determining the availability of the first locked storage container to receive the first delivery at one or more times by use of the scheduler;

identifying, using the scheduler, a first time interval during which the first delivery can be made; and the delivery system sending to the first locked storage container an access signal allowing a first delivery person who is delivering the delivery to access the first locked storage container only during the first time interval.

2. The method of claim 1 further including the steps of:

ordering a second delivery of one or more goods for the first customer;

following the ordering of the second delivery, determining the availability of the first locked storage container to receive the second delivery at one or more times by use of the scheduler;

identifying, using the scheduler, a second time interval during which the second delivery can be made; and the delivery system sending to the first locked storage container an access signal allowing a second delivery person who is delivering the second delivery to access the first locked storage container only during the second time interval.

3. The method of claim 2 further including the steps of:

ordering a delivery of one or more goods for a second customer associated with a second locked storage container of the plurality of locked storage containers;

following the ordering of the last-mentioned delivery, determining the availability of the second locked storage container to receive the last-mentioned delivery at one or more times by use of the scheduler;

identifying, using the scheduler, a second customer time interval during which the last-mentioned delivery can be made; and the delivery system sending to the second locked storage container an access signal allowing a delivery person who is delivering the last-mentioned delivery to access the second locked storage container only during the second customer time interval.

4. The method of claim 2 further including the step of having the first delivery person open the first locked storage container using an identifier corresponding to the first delivery person and the second delivery person opens the first locked storage container using an identifier corresponding to the second delivery person.

5. The method of claim 1 further including the steps of: following the ordering, determining the size of the delivery using the delivery system; and checking available room with the first locked storage container by use of the delivery system.

6. The method of claim 5 further including the step of:

upon availability as indicated by the checking step, reserving, by operation of the delivery system, sufficient room within the first locked storage container to receive the delivery.

7. The method of claim 1 further includes the step of: following the first delivery, charging an account of the first customer for the first delivery upon the first locked storage container signaling the delivery system of the insertion of the first delivery into the first locked storage container.

8. The method of claim 7 wherein the first locked storage container signals the delivery system of the insertion of the first delivery into the first locked storage container based on access by the first delivery person.

9. A method of delivery of ordered items to a plurality of locked storage containers using a delivery system, the steps including:

ordering a delivery of one or more goods to a first customer;

following the ordering, determining the size of the delivery using the delivery system;

checking available room within a first locked storage container of the plurality of locked storage containers, the first locked storage container corresponding to the first customer, by use of the delivery system;

upon availability, reserving, by operation of the delivery system, sufficient room within the first locked storage container to receive the delivery; and delivering the delivery to within the first locked storage container.

10. The method of claim 9 further including the step of: upon finding that the available room within the first locked storage container is insufficient for the size of the delivery, dividing the ordered delivery into at least first and second partial deliveries for separate delivery upon there being available room.

11. The method of claim 10 wherein the delivery system includes a scheduler and the method further includes the steps of:

following the ordering of the delivery, determining the availability of the first locked storage container to receive the first and parts at one or more times by use of the scheduler;

identifying, using the scheduler, a first time interval during which the first partial delivery can be made and a second time interval during which the second partial delivery can be made; and the delivery system sending to the first locked storage container an access signal allowing access to the first locked storage container only during the first time interval for delivery of the first partial delivery and during the second time interval for delivery of the second partial delivery.

12. The method of claim 11 wherein, prior to dividing the ordered delivery, input is received from the customer indicating the customer's preference for a complete delivery or delivery in multiple portions; and the scheduler schedules delivery according to the customer's preference.

13. The method of claim 12 further including the step of: charging an account of the first customer for a delivery upon the locked storage container signaling the delivery system of the insertion of a delivery into the locked storage container.

14. The method of claim 9 further including the step of: charging an account of the first customer for a delivery upon the locked storage container signaling the delivery system of the insertion of a delivery into the locked storage container.

15. A method for delivery of ordered items to a plurality of locked storage containers using a delivery system, the steps includes:

ordering a delivery of one or more goods to a customer;

following the ordering, determining the availability of one of locked storage containers to receive the delivery at one or more times by use of a scheduler; identifying, using the scheduler, a first time interval during which the delivery can be made; and the delivery system sending to the one of the locked storage containers an access signal allowing a first delivery person who is delivering the delivery to access the one of the locked storage containers only during the first time interval;

delivering the delivery to within one of the locked storage containers corresponding to the customer; and automatically sending a DELIVERY MADE signal from the one of the locked storage containers signaling the delivery system of the insertion of the delivery into the one of the locked storage containers.

16. The method of claim 15 wherein, upon the delivery system receiving the DELIVERY MADE signal, the delivery system performs one or more steps selected from the group consisting of:

charging an account of the customer for the delivery; and automatically initiating a communication to the customer.

17. The method of claim 16 further including the steps of:

following the ordering, determining the size of the delivery using the delivery system; and checking available room with the one of the locked storage containers by use of the delivery system.

18. The method of claim 17 further including the step of:

upon availability as indicated by the checking step, reserving, by operation of the delivery system, sufficient room within the one of the locked storage containers to receive the delivery.

19. The method of claim 18 wherein the one of the locked storage containers signals the delivery system of the insertion of the delivery into the one of the locked storage containers based on access by a delivery person.

20. The method of claim 15 wherein the one of the locked storage containers signals the delivery system of the insertion of the delivery into the one of the locked storage containers based on access by a delivery person.

21. A delivery system for delivery of items comprising:

a plurality of locked storage containers at different locations, each locked storage container corresponding to a customer:order receiver within the delivery system for receiving orders for delivery of one or more goods for customer;

availability determiner for determining the availability of the locked storage containers to receive deliveries at one or more times;

a scheduler receiving availability information from the availability determiner and operable to identify a time interval during which the delivery can be made and operable to send to a locked storage container an access signal allowing a delivery person who is delivering a delivery to access the locked storage container only during the time interval identified by the scheduler.

* * * * *